Patented Nov. 25, 1947

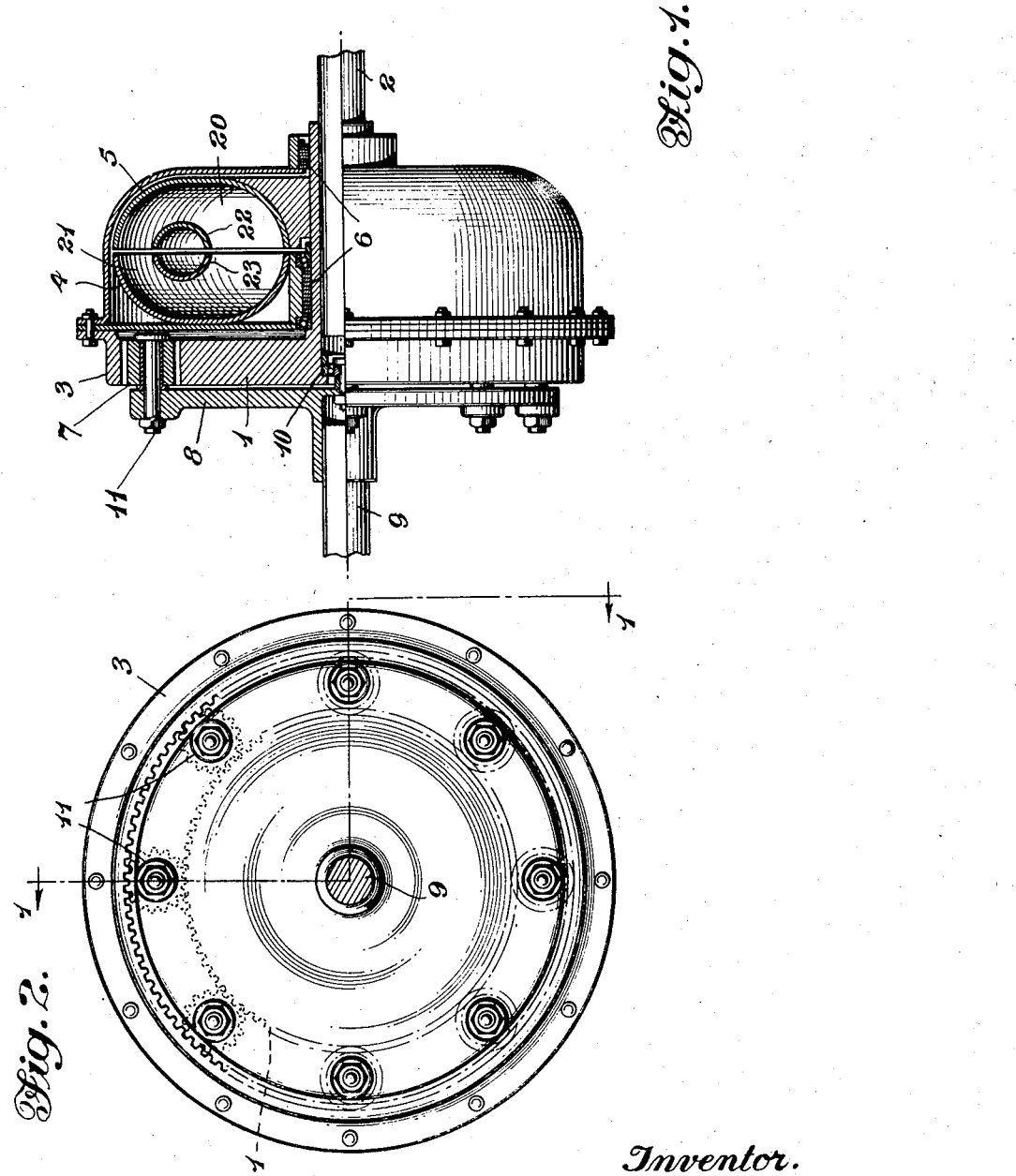

2,431,318

UNITED STATES PATENT OFFICE 2,431,318

TURBO PLANETARY TRANSMISSION

Frampton E. Ellis, Jr., United States Navy

Application August 20, 1945, Serial No. 611,666

1 Claim. (Cl. 74—189.5)

(Granted under the act of March 3, 1883, as amended April 30, 1928; 370 O. G. 757)

This invention pertains to a turbo-planetary transmission.

Essentially the invention is directed to a turbo-planetary gear system in which one of the elements, either the annular gear or sun gear, is not mechanically restrained in rotation with respect to the remainder of the system but receives its power or torque through a fluid coupling or turbo hydraulic drive. Consequently only a portion of the power is transmitted through the turbo portion of the system, the remainder being transmitted by the gear system at high efficiency.

The purpose of this invention is to provide a flexible connection between the driver and the driven elements of the power transmission system to enable the two elements to turn at different speeds relative to each other in response to changes in either load or power input.

Details of the invention are described in connection with the following drawings in which:

Fig. 1 is a partial section of the transmission system on line I—I of Fig. 2; and Fig. 2 is an end view.

The preferred form of the invention is shown in Fig. 1.

In this unit the sun gear I is rigidly secured to drive shaft 2. Annular gear 3 is secured to turbo wheel 4 which in turn is driven by wheel 5. Wheel 5 is secured to drive shaft 2.

Turbo wheels 4 and 5 operate in the manner of the conventional fluid drive. Driving wheel 5 and driven wheel 4 are each provided with cooperating vanes 20 and 21 and are also provided with guide rings 22 and 23 which are juxtaposed to form a core around which the impelling fluid in the working chambers circulate.

Leakage of the fluid from the fluid drive unit is prevented by suitable seals 6.

Planetary gears 7 are pivoted on trunnions II which are supported on wheel 8. The arrangement of these planetary gear trunnions are shown in Fig. 2. Wheel 8 is rigidly attached to output shaft 9 so that as sun gear I and annular gear 3 rotate at different speeds relative to each other and mesh with planetary gears 7, rotational energy will be transmitted to wheel 8 and output shaft 9. Bearing 10 acts as a spacer to maintain proper gear clearance.

It will be apparent that the power transmission might be reversed in direction by making shaft 9 the power input shaft in which case shaft 2 would become the output shaft.

The transmission described above possesses the flexibility of a pure fluid drive while retaining to a considerable extent the inherent efficiency of power transmission through gears. By varying the arrangement of the fixed and turbo driven gears, the relative sizes of the various gears, and the characteristics of the turbo unit itself, a great variety of units may be obtained having widely varying speed-load characteristics.

The invention described herein may be manufactured and used by or for the Government of the United States of America for governmental purposes without the payment of any royalties thereon or therefor.

Having described my invention, I claim:

In a device of the class described, the combination of a fluid coupling device having impeller and turbine members and a planetary unit incorporating sun and orbit gears and a carrier, a driving shaft, a driven shaft coaxial therewith, one of said shafts carrying a sleeve, said impeller member and said sun gear being mounted on said sleeve, said planetary carrier being fastened to the other of said shafts, planetary pinions on said carrier, said orbit gear being rotatably mounted on said sleeve and meshing with said pinions, said fluid turbine member being connected to said orbit gear and oppositely facing with respect to said impeller member, said orbit gear further carrying a housing member which surrounds said impeller member and turbine member to form a closed housing therewith.

FRAMPTON E. ELLIS, JR.

REFERENCES CITED

The following references are of record in the file of this patent:

UNITED STATES PATENTS

| Number | Name | Date |
|---|---|---|
| 1,203,265 | Radcliffe | Oct. 31, 1916 |
| 1,949,816 | Smith-Clarke | Mar. 6, 1934 |
| 2,240,650 | Heger | May 6, 1941 |
| 2,303,829 | Dodge | Dec. 1, 1942 |
| 2,336,055 | Bacon | Dec. 7, 1943 |